(12) United States Patent
Kurosaki et al.

(10) Patent No.: US 8,248,573 B2
(45) Date of Patent: Aug. 21, 2012

(54) LIQUID CRYSTAL DISPLAY ELEMENT AND MULTI-LAYER LIQUID CRYSTAL DISPLAY ELEMENT INCLUDING THE ELEMENT

(75) Inventors: Yoshihisa Kurosaki, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/717,549

(22) Filed: Mar. 4, 2010

(65) Prior Publication Data

US 2010/0157215 A1   Jun. 24, 2010

Related U.S. Application Data

(63) Continuation of application No. PCT/JP2007/068235, filed on Sep. 20, 2007.

(51) Int. Cl.
*G02F 1/1333* (2006.01)
(52) U.S. Cl. ............ 349/158; 349/74; 349/115
(58) Field of Classification Search ........... 349/74
See application file for complete search history.

(56) References Cited

U.S. PATENT DOCUMENTS

| | | | |
|---|---|---|---|
| 5,386,307 A | 1/1995 | Jang | |
| 6,597,419 B1 * | 7/2003 | Okada et al. ........... | 349/104 |
| 6,809,788 B2 | 10/2004 | Yamada et al. | |
| 2003/0234905 A1 | 12/2003 | Gilles et al. | |
| 2003/0235722 A1 * | 12/2003 | Blanckaert et al. ........ | 429/9 |
| 2008/0115883 A1 | 5/2008 | Mishima et al. | |
| 2009/0009707 A1 | 1/2009 | Kurosaki et al. | |

FOREIGN PATENT DOCUMENTS

| | | |
|---|---|---|
| GB | 2049214 A | 12/1980 |
| JP | 3-200120 A | 9/1991 |
| JP | 3-200120 A1 | 9/1991 |
| JP | 6-347818 A | 12/1994 |
| JP | 2001-100256 A | 4/2001 |
| JP | 2002-116461 A | 4/2002 |
| JP | 2004-29800 A | 1/2004 |
| JP | 2004-170868 A | 6/2004 |
| JP | 2006-313404 A | 11/2006 |
| JP | 2008-129270 A | 6/2008 |
| WO | 2007/102197 A1 | 9/2007 |

OTHER PUBLICATIONS

International Search Report of PCT/JP2007/068235, mailing date of Oct. 23, 2007.

* cited by examiner

*Primary Examiner* — Richard Kim
(74) *Attorney, Agent, or Firm* — Westerman, Hattori, Daniels & Adrian, LLP

(57) ABSTRACT

The invention relates to a liquid crystal display element having a liquid crystal enclosed between a pair of substrates and a multi-layer liquid crystal display element utilizing such elements. A liquid crystal display element having improved strength at enclosing portions thereof is provided without any reduction in the throughput of manufacturing steps along with a multi-layer liquid crystal display element utilizing such elements. A liquid crystal display element for blue includes a first substrate having a first through hole formed to extend from one surface to another, a second substrate disposed opposite to the first substrate and having a second through hole formed opposite to the first through hole to extend from one surface to another, the second through hole having an area greater than that of the first through hole, a liquid crystal layer for blue sandwiched between the first and second substrates, and an enclosing material sealing the first and second through holes such that the liquid crystal for blue forming the liquid crystal layer for blue does not leak through the first and second through holes.

10 Claims, 11 Drawing Sheets

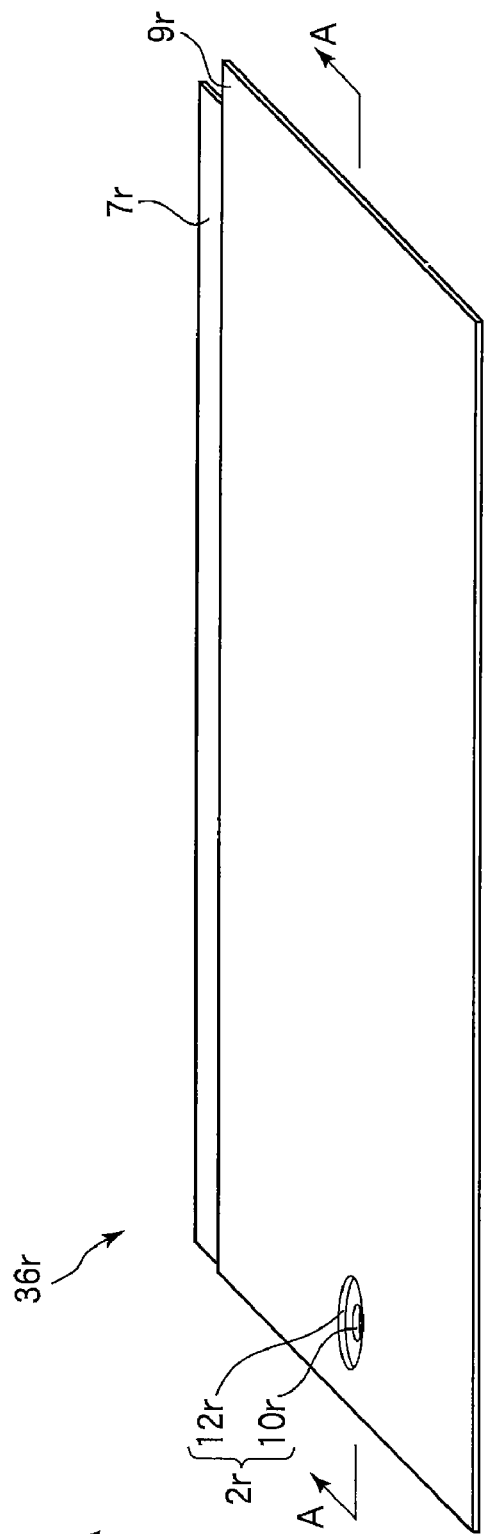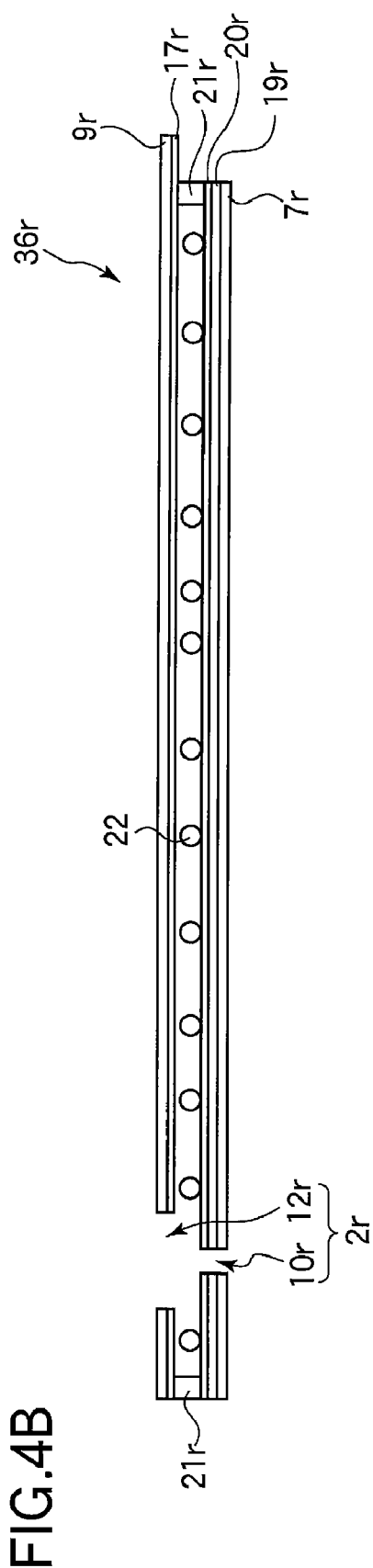
FIG.4A
FIG.4B

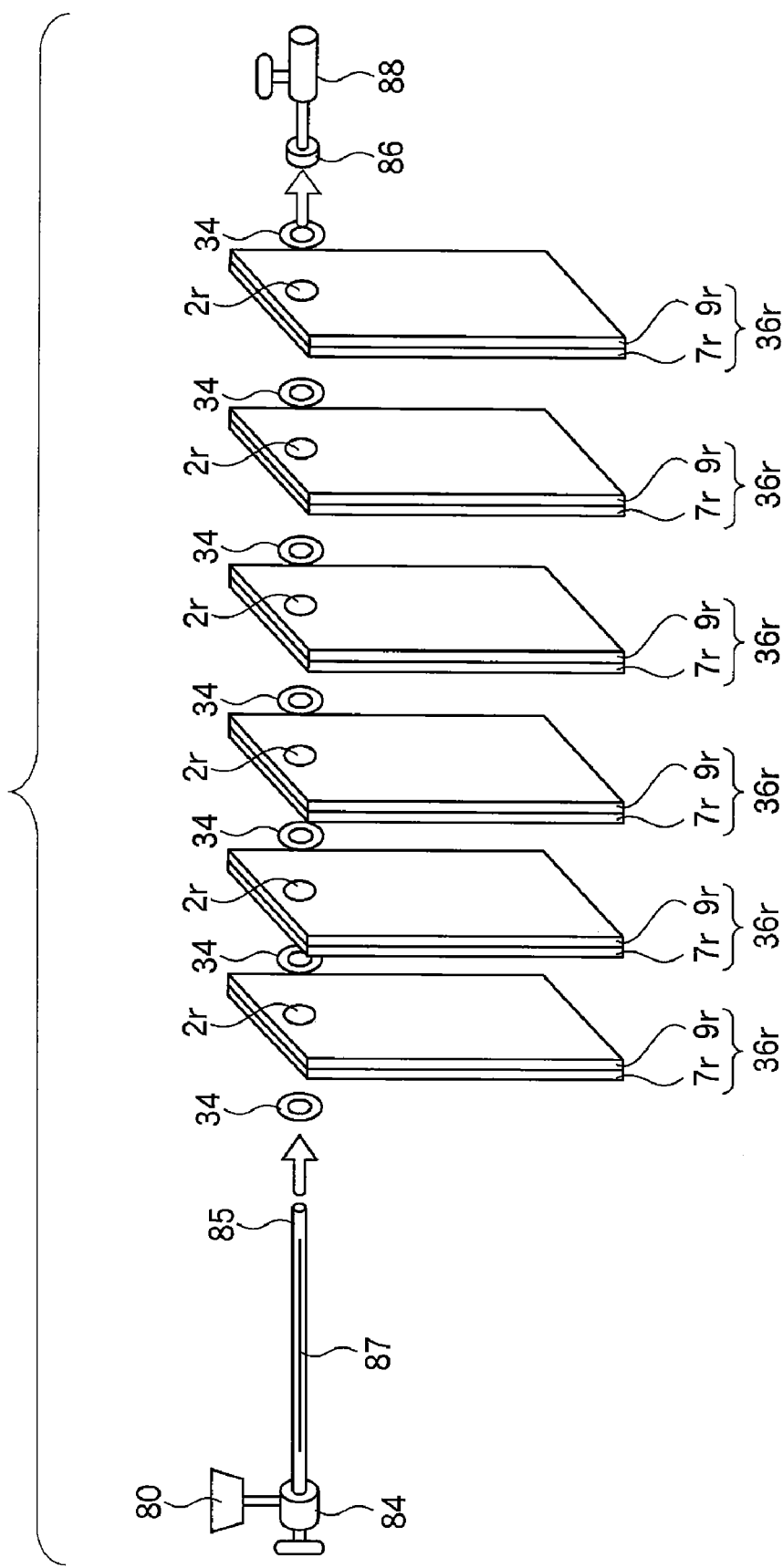

LIQUID CRYSTAL DISPLAY ELEMENT AND MULTI-LAYER LIQUID CRYSTAL DISPLAY ELEMENT INCLUDING THE ELEMENT

This Application is a continuation of International Application No. PCT/JP2007/068235, filed Sep. 20, 2007.

BACKGROUND OF THE INVENTION

1. Field of the Invention

The present invention relates to a liquid crystal display element provided by enclosing a liquid crystal between a pair of substrates and a multi-layer liquid crystal display element including such elements.

2. Description of the Related Art

Recently, various enterprises and universities are actively engaged in the development of electronic paper on which an image can be electrically rewritten and which can keep an image displayed thereon even when electric power is not supplied. Display methods used for electronic paper include electrophoretic methods utilizing movement of charged particles in air or a liquid, twist ball methods utilizing rotation of two types of charged particles having different colors, and methods utilizing interference reflection at a liquid crystal layer formed by a selective reflection type liquid crystal having bi-stability. Primary characteristics required for electronic paper are low power consumption, the capability of displaying a memorized state of display without electric power, flexibility.

According to a cholesteric liquid crystal display method utilizing a liquid crystal composition which forms a cholesteric phase (such a composition is called a cholesteric liquid crystal or chiral nematic liquid crystal and will hereinafter be referred to as "cholesteric liquid crystal"), a flexible liquid crystal display element can be formed using resin substrates having transparent electrodes or resin substrates having amorphous silicon. Flexible electronic paper can be fabricated by using such a liquid crystal display element as a display section.

A multi-layer liquid crystal display element capable of full-color display utilizing cholesteric liquid crystals has a structure in which a liquid crystal display element for blue reflecting blue (B) light selectively, a liquid crystal display element for green reflecting green (G) light selectively, and a liquid crystal display element for red reflecting red (R) light selectively are formed one over another in the order listed from the side of the element where a display surface is provided. Each of the B, G, and R liquid crystal display elements has a structure formed by enclosing a liquid crystal between a pair of substrates, i.e., top and bottom substrates.

Known methods of enclosing a liquid crystal between a pair of substrates include the vacuum injection method and one drop filling (ODF) method which are commonly used. According to the vacuum injection method, a peripheral seal member in the form of a frame having a partial discontinuation is applied to the periphery of one substrate, and the substrate is then combined with another substrate to form a liquid crystal cell. Thereafter, a liquid crystal is injected into the gap between the pair of substrates by a vacuum pump system using the discontinuation of the peripheral seal member as a liquid crystal injection port. After liquid crystal injection is finished, the liquid crystal injection port is sealed with an adhesive member to enclose the liquid crystal. A photo-curing bonding member, e.g., an acrylic member is used as the adhesive member for enclosure. Such an adhesive member for enclosure comes into contact with the liquid crystal before it is cured and can therefore contaminate the liquid crystal, which can result in display defects of the liquid crystal display element. For this reason, limited types of materials can be used as the peripheral seal member. For example, a thermo-curing epoxy type adhesive member which may include a solvent in an uncured state is a material that is difficult to use as the peripheral seal member.

When compared to glass substrates, resin substrates having flexibility have lower adhesion to an acrylic adhesive member which can be used for enclosing a liquid crystal. Further, since resin substrates have flexibility, an enclosing portion of a liquid crystal display element using such substrates suffers from breakage starting at an edge of the junction rather than surface breakage at the junction unlike an element having glass substrate. Thus, the strength of the resin substrates is further reduced. When the internal pressure of the liquid crystal display element rises as a result of a change in the volume of the liquid crystal attributable to a temperature change, the enclosing portion of the resin substrates can be broken, which results in the problem of leakage of the liquid crystal from the element.

Patent Document 1: JP-A-2006-313404
Patent Document 2: PCT/JP06/304343

SUMMARY OF THE INVENTION

It is an object of the invention to provide a liquid crystal display element having improved strength at an enclosing portion thereof achieved without reducing throughput of manufacturing steps and to provide a multi-layer liquid crystal display element including such elements.

The above-described object is achieved by a liquid crystal display element including a first substrate having a first through hole formed to extend from one surface to another, a second substrate disposed opposite to the first substrate and having a second through hole formed opposite to the first through hole to extend from one surface to another, the second through hole having an area greater than that of the first through hole, a seal material provided in the form of a frame extending along the peripheries of the first and second substrates to secure the first and second substrates with each other, a liquid crystal sandwiched between the first and second substrates and an enclosing material sealing the first and second through holes such that the liquid crystal does not leak through the first and second through holes.

The above invention is characterized in that an enclosing region on the first substrate provided by the enclosing material has an area greater than the area of an enclosing region on the second substrate.

The above invention is characterized in that the enclosing material flows into the gap between the first and second substrates to fill the first and second through holes.

The above invention is characterized in that the center axis of the first through hole is substantially aligned with the center axis of the second through hole.

The above invention is characterized in that the first and second through holes have a curved aperture shape when viewed in the normal direction of substrate surfaces of the first and second substrates.

The above invention is characterized in that the first and second through holes are disposed in the neighborhood of peripheries of the first and second substrates.

The above invention is characterized in that the liquid crystal is a cholesteric liquid crystal selectively reflecting light having a wavelength in a visible band.

The above-described object is achieved by a multi-layer liquid crystal display element including a plurality of liquid crystal display elements stacked one over another, the elements having a liquid crystal sandwiched between first and second substrates disposed opposite to each other, wherein the liquid crystal display elements are liquid crystal display elements according to the above invention.

The above invention is characterized in that the liquid crystal display elements disposed on two sides of the stack are disposed such that the first through holes thereof open to the exterior of the stack.

The above invention is characterized in that the first and second through holes formed in each of the plurality of liquid crystal display elements stacked one over another are disposed in such positions that they overlap each other when viewed in the normal direction of the substrate surfaces of the first and second substrates.

The above invention is characterized in that the first and second through holes formed in each of the plurality of liquid crystal display elements stacked one over another are disposed in such positions that they do not overlap each other when viewed in the normal direction of the substrate surfaces of the first and second substrates.

The above invention is characterized in that the liquid crystal is a cholesteric liquid crystal selectively reflecting light having a wavelength in a visible band and the plurality of liquid crystal display elements selectively reflect light having wavelengths different from each other.

The invention makes it possible to provide a liquid crystal display element having improved strength of an enclosing portion thereof achieved without reducing throughput of manufacturing steps and to provide a multi-layer liquid crystal display element including such elements stacked one over another.

BRIEF DESCRIPTION OF THE DRAWINGS

FIGS. 4A and 4B are illustrations for explaining a step (I) for manufacturing the multi-layer liquid crystal display element 1 according to the embodiment of the invention;

FIG. 5 is an illustration for explaining the step (II) for manufacturing the multi-layer liquid crystal display element 1 according to the embodiment of the invention;

DETAILED DESCRIPTION OF THE INVENTION

Figure 1:
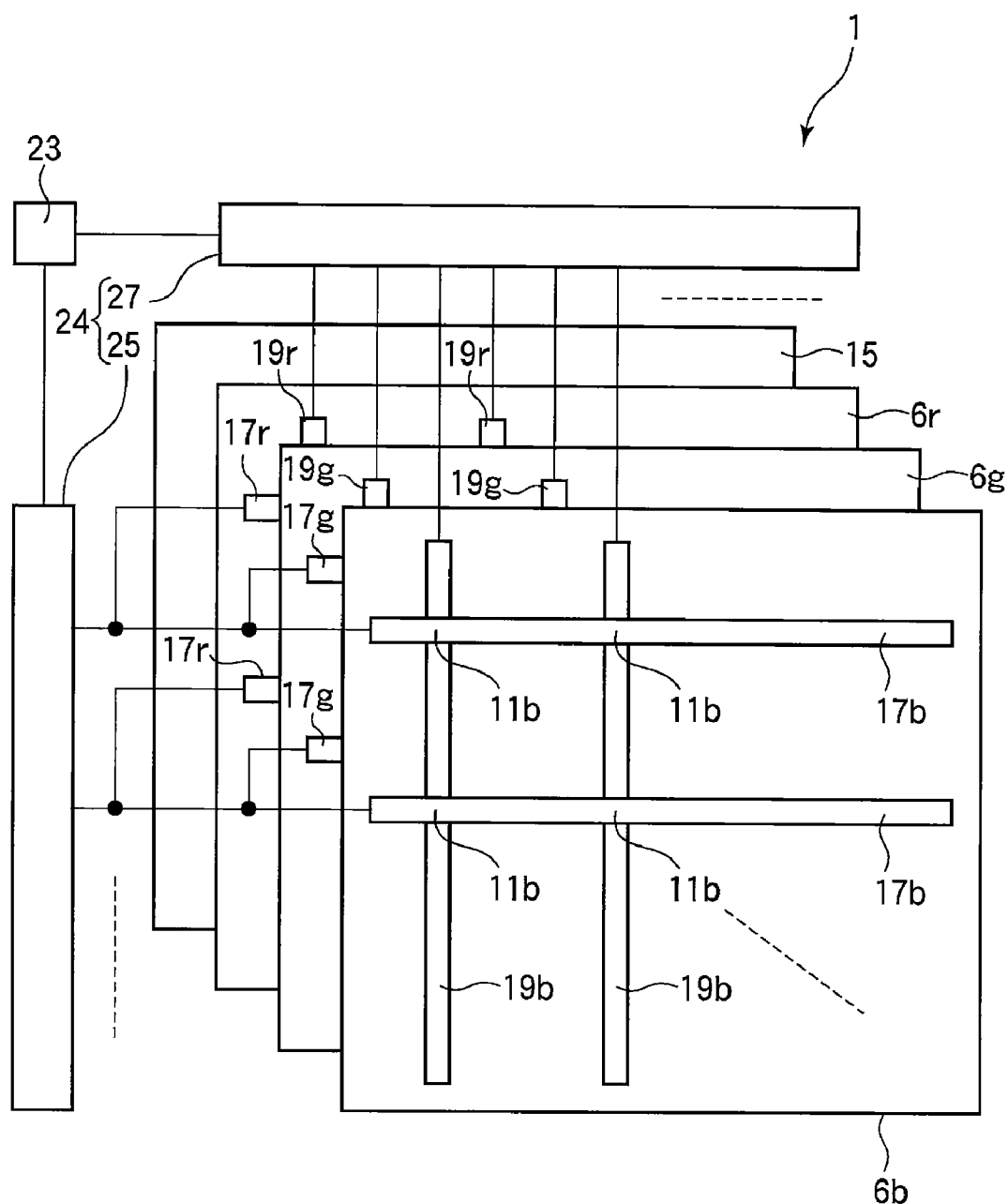
FIG. 1 is an illustration showing a schematic configuration of a multi-layer liquid crystal display element 1 according to an embodiment of the invention.
Figure 2:
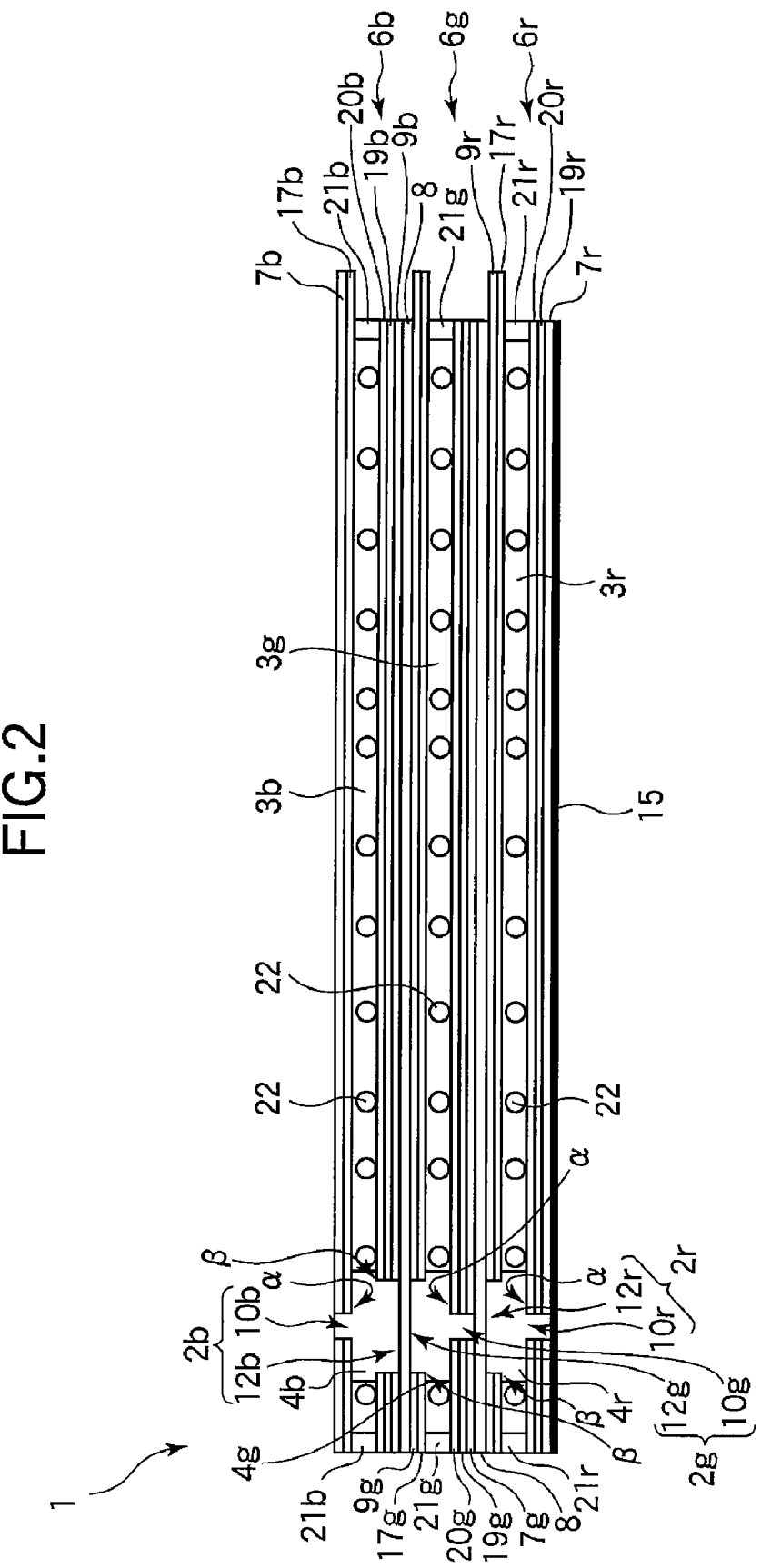
FIG. 2 is an illustration showing a sectional configuration of a display section of the multi-layer liquid crystal display element 1 according to the embodiment of the invention.

A liquid crystal display element and a multi-layer liquid crystal display element including such elements according to an embodiment of the invention will now be described with reference to FIGS. 1 to 11. FIG. 1 shows a schematic configuration of a multi-layer liquid crystal display element 1 according to the present embodiment. FIG. 2 schematically shows a sectional configuration of a display section of the multi-layer liquid crystal display element 1, the sectional view being taken on an imaginary plane which includes center axes of a first through hole 10$b$ and a second through hole 12$b$ and which is parallel to scan electrodes 17$b$ and orthogonal to a first substrate 7$b$ and a second substrate 9$b$.

As shown in FIGS. 1 and 2, the multi-layer liquid crystal display element 1 includes a B liquid crystal display element 6$b$ selectively reflecting blue (B) light as a selected wave band in a planar state, a G liquid crystal display element 6$g$ selectively reflecting green (G) light as a selected wave band in the planar state, and an R liquid crystal display element 6$r$ selectively reflecting red (R) light as a selected wave band in the planar state. That is, the multi-layer liquid crystal display element 1 includes B, G, and R liquid crystal display elements 6$b$, 6$g$, and 6$r$ which selectively reflect respective rays of light having dominant wavelengths different from each other. The B, G, and R liquid crystal display elements 6$b$, 6$g$, and 6$r$ are formed one over another in the order listed from the side of the element where a light entering surface (display surface) is provided. The B liquid crystal display element 6$b$ is secured to the G liquid crystal display element 6$g$ by a bonding layer 8 formed on the G liquid crystal display element 6$g$. The G liquid crystal display element 6$g$ is secured to the R liquid crystal display element 6$r$ by another bonding layer 8 formed on the R liquid crystal display element 6$r$.

The B liquid crystal display element 6$b$ includes a first substrate 7$b$ which has a first through hole 10$b$ formed to extend from one surface to another and a second substrate 9$b$ which is disposed opposite to the first substrate 7$b$ and which has a second through hole 12$b$ formed opposite to the first through hole 10$b$ to extend from one surface to another, the second through hole having an aperture area greater than that of the first through hole. The B liquid crystal display element 6$b$ includes a seal material 21$b$ provided in the form of a frame extending along the peripheries of the first substrate 7$b$ and the second substrate 9$b$ to secure the first substrate 7$b$ and the second substrate 9$b$ to each other, a blue (B) liquid crystal layer 3$b$ sandwiched between the first substrate 7$b$ and the second substrate 9$b$, and an enclosing material 4$b$ sealing the first through hole 10$b$ and the second through hole 12$b$ to prevent the liquid crystal for blue forming the B liquid crystal layer 3$b$ from leaking through the first through hole 10$b$ and the second through hole 12$b$.

The first through hole 10$b$ and the second through hole 12$b$ have different opening shapes, and the holes are provided near the peripheries of the first substrate 7$b$ and an inside of the seal material 21$b$. As a result, the B liquid crystal and the enclosing material 4$b$ are mixed with each other in no area of the display surface of the B liquid crystal display element 6$b$, and the generation of display defects is thereby prevented. The center axis of the first through hole 10$b$ is substantially aligned with the center axis of the second through hole 12$b$. The area of the first through hole 10$b$ in an in-plane direction of the substrate is smaller than the area of the second through hole 12b in the same direction. Therefore, the first through hole 10b is located inside the second through hole 12b when viewed in the normal direction of the substrate surfaces of the first substrate 7b.

The first through hole 10b and the second through hole 12b constitute a liquid crystal injection port 2b through which the B liquid crystal is injected. The first through hole 10b and the second through hole 12b have a curved aperture shape when viewed in the normal direction of the substrate surfaces. In the present embodiment, the first through hole 10b and the second through hole 12b have a circular aperture shape when viewed in the normal direction. Therefore, the liquid crystal injection port 2b is a concentric circle shape when viewed in the normal direction. The aperture shape of the first through 10b and the second through hole 12b is not limited to circular shapes, and it is desirable that the holes have a shape without angled parts, e.g., an elliptic shape. The first through hole 10b and the second through hole 12b are formed, for example, by punching the first substrate 7b and the second substrate 9b. It is not preferable that the holes have an angled shape such as a polygonal shape because the substrates can be cracked from angled parts of such a shape when they are punched.

The enclosing material 4b flows into the gap between the first substrate 7b and the second substrate 9b to fill the first through hole 10b and the second through hole 12b. When the first through hole 10b and the second through hole 12b having different diameters are filled with the enclosing material 4b, the enclosing material 4b can be put in contact with the first substrate 7b in a relatively great contact region α because the substrate has the first through hole 10b with the smaller diameter. Since the enclosing material 4b flows into the gap between the first substrate 7b and the second substrate 9b, it can be put in contact with the second substrate 9b having the second through hole 12b in a contact region β.

The enclosing material 4b contacts the first substrate 7b in the contact region α which has an area greater than the area of the contact region β where the material contacts the second substrate 9b. The term "contact region" means a region where the enclosing material 4b contacts the first substrate 7b or the second substrate 9b when viewed in an in-plane direction of the first substrate 7b or the second substrate 9b. As will be described later, the second substrate 9b is bonded to the G liquid crystal display element 6g by a bonding layer 8. Therefore, the enclosing material 4b contacts not only the second through hole 12b but also the bonding layer 8, and the material contacts other features of the element in a wide area. On the side of the element where the second substrate 9b is located, the effect of the enclosing material 4b preventing leakage of the B liquid crystal is enhanced by the bonding layer 8. Thus, the strength of the enclosing part of the B liquid crystal display element 6b can be made higher than that of a multi-layer liquid crystal display element 51 according to the related art which will be described later with reference to FIG. 3. Therefore, even when an acrylic adhesive material is used as the enclosing material 4b, the B liquid crystal of the B liquid crystal display element 6b can be prevented from leaking through the first through hole 10b and the second through hole 12b due to breakage of the enclosing material 4b regardless of an increase in the internal pressure of the element as a result of a change in the volume of the B liquid crystal layer 6b attributable to a temperature change.

The G liquid crystal display element 6g includes a first substrate 7g which has a first through hole 10g formed to extend from one surface to another and a second substrate 9g which is disposed opposite to the first substrate 7g and which has a second through hole 12g formed opposite to the first through hole 10g to extend from one surface to another, the second through hole having an aperture area greater than that of the first through hole. The G liquid crystal display element 6g includes a seal material 21g provided in the form of a frame extending along the peripheries of the first substrate 7g and the second substrate 9g to secure the first substrate 7g and the second substrate 9g to each other, a green (G) liquid crystal layer 3g sandwiched between the first substrate 7g and the second substrate 9g, and an enclosing material 4g sealing the first through hole 10g and the second through hole 12g to prevent the liquid crystal for green forming the G liquid crystal layer 3g from leaking through the first through hole 10g and the second through hole 12g. The first through hole 10g and the second through hole 12g constitute a liquid crystal injection port 2g.

The R liquid crystal display element 6r includes a first substrate 7r which has a first through hole 10r formed to extend from one surface to another and a second substrate 9r which is disposed opposite to the first substrate 7r and which has a second through hole 12r formed opposite to the first through hole 10r to extend from one surface to another, the second through hole having an aperture area greater than that of the first through hole. The R liquid crystal display element 6r includes a seal material 21r provided in the form of a frame extending along the peripheries of the first substrate 7r and the second substrate 9r to secure the first substrate 7r and the second substrate 9r to each other, a red (R) liquid crystal layer 3r sandwiched between the first substrate 7r and the second substrate 9r, and an enclosing material 4r sealing the first through hole 10r and the second through hole 12r to prevent the liquid crystal for red forming the R liquid crystal layer 3r from leaking through the first through hole 10r and the second through hole 12r. The first through hole 10r and the second through hole 12r constitute a liquid crystal injection port 2r.

The first through holes 10g and 10r and the second through holes 12g and 12r formed in the G liquid crystal display element 6g and the R liquid crystal display element 6r, respectively, will not be described because they are formed in shapes substantially similar to the shapes of the first through hole 10b and the second through hole 12b formed in the B liquid crystal display element 6b. The enclosing materials 4g and 4r of the G liquid crystal display element 6g and the R liquid crystal display element 6r will not be described because they are formed in shapes substantially similar to the shape of the enclosing material 4b of the B liquid crystal display element 6b to provide similar effects and functions.

The first through holes 10b, 10g, and 10r and the second through holes 12b, 12g, and 12r formed in the respective B, G, and R liquid crystal display elements 6b, 6g, and 6r stacked one over another are disposed in such positions that the through holes overlap each other when viewed in the normal direction of the substrates 7b, 7g, 7r, 9b, 9g, and 9r.

The B liquid crystal layer 3b is formed by a cholesteric liquid crystal having an average refractive index n and a helical pitch p adjusted to reflect blue light selectively and having rightward optical rotatory power (rightward chirality). The liquid crystal reflects blue right-handed circularly polarized light and transmits other types of light in the planar state, and it transmits substantially all types of light in the focal conic state.

The G liquid crystal layer 3g is formed by a cholesteric liquid crystal having an average refractive index n and a helical pitch p adjusted to reflect green light selectively and having leftward optical rotatory power (leftward chirality). The liquid crystal reflects green left-handed circularly polarized light and transmits other types of light in the planar state, and it transmits substantially all types of light in the focal conic state.

The R liquid crystal layer 3r is formed by a cholesteric liquid crystal having an average refractive index n and a helical pitch p adjusted to reflect red light selectively and having rightward optical rotatory power (rightward chirality). The liquid crystal reflects red right-handed circularly polarized light and transmits other types of light in the planar state, and it transmits substantially all types of light in the focal conic state.

The cholesteric liquid crystals used as the B, G, and R liquid crystal layers 3b, 3g, and 3r are liquid crystal mixtures obtaining by adding a relatively great amount of chiral additive (also referred to as "chiral material") to a nematic liquid crystal to a content of, for example, 10 to 40 percent by weight. The chiral material content is a value based on an assumption that the total amount of the nematic liquid crystal component and the chiral material constitutes 100 percent by weight. When a nematic liquid crystal includes a relatively great amount of chiral material, a cholesteric phase, which is a great helical twist of nematic liquid crystal molecules, can be formed in the liquid crystal.

Although various types of nematic liquid crystals known in the related art may be used, the B, G, and R liquid crystal layers 3b, 3g, and 3r preferably have dielectric constant anisotropy $\Delta\epsilon$ satisfying $20 \leq \Delta\epsilon \leq 50$ in order to keep driving voltages for the liquid crystal layers relatively low. The cholesteric liquid crystals preferably have refractive index anisotropy $\Delta n$ $0.18 \leq \Delta n \leq 0.24$. When the refractive index anisotropy $\Delta n$ is lower than the range, the liquid crystal layers 3b, 3g, and 3r have low reflectance in the planar state. When the refractive index anisotropy is higher than the range, the B, G, and R liquid crystal layers 3b, 3g, and 3r have significant scatter reflections in the focal conic state, and the layers have higher viscosity which will reduce the speed of response of the layers.

A cholesteric liquid crystal has bi-stability (memory characteristics), and the liquid crystal can be put in any of a planar state, a focal conic state, or an intermediate state that is a mixture of the planar state and the focal conic state by adjusting the intensity of an electric field applied to the same. Once the liquid crystal enters the planar state, the focal conic state, or the mixed or intermediate state, the state is thereafter maintained with stability even if there is not electric field.

For example, the planar state can be obtained by applying a predetermined high voltage between the first substrate 7b and the second substrate 9b to apply a strong electric field to the B liquid crystal layer 3b and thereafter nullifying the electric field abruptly. The focal conic state can be obtained by, for example, applying a predetermined voltage lower than the above-mentioned high voltage between the first substrate 7b and the second substrate 9b to apply an electric field to the B liquid crystal layer 3b and thereafter nullifying the electric field abruptly.

The intermediate state that is a mixture of the planar and focal conic state can be obtained by, for example, applying a voltage lower than the voltage to obtain the focal conic state between the first substrate 7b and the second substrate 9b to apply an electric field to the B liquid crystal layer 3b and thereafter nullifying the electric field abruptly. The G liquid crystal layer 3b and the R liquid crystal layer 3r cab be set in the planar state, the focal conic state, or the intermediate state that is a mixture of the planar and focal conic state by applying a predetermined voltage in the same way as done for the B liquid crystal layer 3b.

Principles of display operations of the multi-layer liquid crystal display element 1 utilizing cholesteric liquid crystals will now be described using the B liquid crystal display element 6b as an example. When the B liquid crystal layer 3b of the B liquid crystal display element 6b is in the planar state, the liquid crystal molecules are sequentially rotated in the direction of the thickness of the substrates to form a helical structure, and the helical axis of the helical structure is substantially perpendicular to the substrate surfaces.

In the planar state, light in a predetermined wave band in accordance with the helical pitch of the liquid crystal molecules is selectively reflected by the liquid crystal layer. The reflected light is circularly polarized light which is either left- or right-handed depending on the chirality of the helical pitch, and other types of light are transmitted by the liquid crystal layer. Natural light is a mixture of left- and right-handed circularly polarized light. Therefore, when natural light impinges on the liquid crystal layer in the planar state, it may be assumed that 50% of the incident light is reflected with the other 50% transmitted in the predetermined wave band.

A wavelength $\lambda$ at which maximum reflection takes place is given by $\lambda = n \cdot p$ where n represents the average refractive index of the liquid crystal layer and p represents the helical pitch.

A reflection band $\Delta\lambda$ of a liquid crystal becomes greater with the refractive index anisotropy $\Delta n$ of the liquid crystal. Therefore, in order to allow blue light to be selectively reflected by the B liquid crystal layer 3b of the B liquid crystal display element 6b in the planar state, the average refractive index n and the helical pitch p are determined, for example, such that an equation "$\lambda = 480$ nm" holds true. The average refractive index n can be adjusted by selecting the liquid crystal material and the chiral material appropriately, and the helical pitch p can be adjusted by adjusting the chiral material content. A liquid crystal display element which displays green in the planar state can be provided by using a liquid crystal which satisfies "$\lambda = 545$ nm"

The chiral material added in the cholesteric liquid crystals for blue and red and the chiral material added in the cholesteric liquid crystal for green are optimal isomers which are different from each other in optical rotatory power. Therefore, the cholesteric liquid crystals for blue and red have the same optical rotatory power which is different from the optical rotatory power of the cholesteric liquid crystal for green.

The center wavelengths of the reflectance spectra of the R, G, and B liquid crystal layers 3r, 3g, and 3b in the planar state have magnitudes ascending in the order in which the liquid crystal layers are listed. In the multi-layer structure formed by the B, G, and R liquid crystal display elements 6b, 6g, and 6r, the optical rotatory power of the G liquid crystal layer 3g is different from the optical rotatory power of the B liquid crystal layer 3b and the R liquid crystal layer 3r in the planar state. The reflectance spectra of the B, G, and R liquid crystal layers 3b, 3g, and 3r has a predetermined range. As a result, in the regions where overlaps exist between the blue and green reflectance spectra and between the green and red reflectance spectra, for example, right-handed circularly polarized light can be reflected by the B liquid crystal layer 3b and the R liquid crystal layer 3r, and left-handed circularly polarized light can be reflected by the G liquid crystal layer 3g. As a result, loss of reflected light can be suppressed to improve the brightness of the display screen of the multi-layer liquid crystal display element 1.

The quantity of light reflected by a cholesteric liquid crystal can be controlled by a helically twisted state of alignment of the liquid crystal molecules. Cholesteric liquid crystals selectively reflecting blue, green and red light rays in the planar state are enclosed to form the B liquid crystal layer 3b, the G liquid crystal layer 3g, and the R liquid crystal layer 3r, respectively, to fabricate the multi-layer liquid crystal display element 1 capable of full-color display. The multi-layer liquid crystal display element 1 has memory characteristics, and it is capable of performing full-color display without consuming electric power except during a screen rewrite.

The first substrates 7b, 7g, and 7r and the second substrates 9b, 9g, and 9r must have translucency. In the present embodiment, for example, pairs of polycarbonate (PC) film substrates cut in longitudinal and transverse sizes of 10 cm×8 cm are used. Film substrates made of polyethylene terephthalate (PET) or the like may be used instead of PC substrates. Such film substrates have sufficient flexibility. In the present embodiment, all of the first substrates 7b, 7g, and 7r and the second substrates 9b, 9g, and 9r have translucency, but the first substrate 7r of the R liquid crystal display element 6r disposed at the bottom of the stack may be opaque.

As shown in FIGS. 1 and 2, a plurality of strip-like data electrodes 19b are formed in parallel on the side of the second substrate 9b of the B liquid crystal display element 6b facing the B liquid crystal layer 3b, the electrodes extending in the vertical direction of FIG. 1. In FIG. 2, reference numeral 19b represents the region where the plurality of data electrodes 19b are provided. A plurality of strip-like scan electrodes 17b are formed in parallel on the side of the first substrate 7b facing the B liquid crystal layer 3b, the electrodes extending in the horizontal direction of FIG. 1. As shown in FIG. 1, the plurality of scan electrodes 17b and the plurality of data electrodes 19b are disposed face-to-face so as to intersect each other when the first substrate 7b and the second substrate 9b are viewed in the normal direction of the surfaces on which the electrodes are formed. In the present embodiment, transparent electrodes are patterned to form 240 scan electrodes 17b and 320 data electrodes 19b in the form of stripes at a pitch of 0.24 mm to allow an image to be displayed with 240×320 dots on a QVGA basis. Each of regions where the electrodes 17b and 19b intersect constitutes a B pixel 11b. A plurality of B pixels 11b are arranged in the form of a matrix having 240 rows and 320 columns.

Unlike the B liquid crystal display element 6b, the R liquid crystal display element 6r has a plurality of strip-like data electrodes 19r formed in parallel on the side of the first substrate 7r facing the R liquid crystal layer 3r, the electrodes extending in the vertical direction of FIG. 1. On the side of the second substrate 9r facing the R liquid crystal layer 3r, a plurality of strip-like scan electrodes 17r are formed in parallel to extend in the horizontal direction of FIG. 1. Reference numeral 19r in FIG. 2 represents the region where the plurality of data electrodes 19r are provided.

As will be detailed later, the layers of the multi-layer liquid crystal display element 1 are stacked such that the first through holes 10b and 10r having the smaller aperture area are disposed at outer parts of the element in order to improve the strength of enclosing portions. Therefore, the first substrate 7b of the B liquid crystal display element 6b is disposed on the display screen side of the element (the top side of the element in FIG. 2), and the first substrate 7r of the R liquid crystal display element 6r is disposed on the side of the element opposite to the display screen. In order to facilitate connection between the scan electrodes 17b and 17r and a scan electrode driving circuit 25 (see FIG. 1), the scan electrodes 17b and 17r must extend in the same direction. Similarly, in order to facilitate connection between the data electrodes 19b and 19r and a data electrode driving circuit 27 (see FIG. 1), the data electrodes 19b and 19r must extend in the same direction. For this reason, the substrates of the R liquid crystal display element 6r and the B liquid crystal display element 6b having the scan electrodes 17b and 17r and the data electrodes 19b and 19r formed thereon are opposite to each other in terms of their positions in the respective elements.

The G liquid crystal display element 6g includes a plurality of strip-like data electrodes 19g formed in parallel on the side of the first substrate 7g facing the G liquid crystal layer 3g in the same way as in the R liquid crystal display element 6r, the electrodes extending in the vertical direction of FIG. 1. On the side of the second substrate 9g facing the G liquid crystal layer 3g, a plurality of strip-like scan electrodes 17g are formed in parallel to extend in the horizontal direction of FIG. 1. Reference numeral 19g in FIG. 2 represents the region where the plurality of data electrodes 19g are provided.

Similarly to the B liquid crystal display element 6b, the element is formed with 240 scan electrodes 17g, 320 data electrodes 19g, and G pixels 11g in the form of a matrix having 240 rows and 320 columns (not shown). The R liquid crystal display element 6r is similarly formed with scan electrodes 17r, data electrodes 19r, and R pixels 11r (not shown). Each set of B, G, and R pixels 11b, 11g, and 11r constitutes one pixel 11 of the multi-layer liquid crystal display element 1. The pixels 11 are arranged in the form of a matrix to form the display screen.

While a typical material used to form the scan electrodes 17b, 17g, and 17r and the data electrodes 19b, 19g, and 19r is an indium tin oxide (ITO), transparent conductive films made of an indium zinc oxide (IZO) or the like may alternatively be used.

A scan electrode driving circuit 25 mounting scan electrode driver ICs for driving the plurality of scan electrodes 17b, 17g, and 17r is connected to the first substrate 7b and the second substrates 9g and 9r. A data electrode driving circuit 27 mounting data electrode driver ICs for driving the plurality of data electrodes 19b, 19g, and 19r is connected to the second substrate 9b and the first substrates 7g and 7r. A driving section 24 is formed by the scan electrode driving circuit 25 and the data electrode driving circuit 27.

The scan electrode driving circuit 25 selects three predetermined scan electrodes 17b, 17g, and 17r based on a predetermined signal output from a control circuit section 23 and simultaneously outputs scan signals to the three scan electrodes 17b, 17g, and 17r. Based on a predetermined signal output from the control circuit section 23, the data electrode driving circuit 27 outputs image data signals for B, G, and R pixels 11b, 11g, and 11r on the selected scan electrodes 17b, 17g, and 17r to the respective data electrodes 19b, 19g, and 19r. For example, general-purpose STN driver ICs having a TCP (tape carrier package) structure are preferably used as the driver ICs for the scan electrodes and the data electrodes.

In the present embodiment, since the B, G, and R liquid crystal display elements 6b, 6g, and 6r can be driven by substantially the same voltage, a predetermined output terminal of the scan electrode driving circuit 25 is commonly connected to predetermined input terminals of the scan electrodes 17b, 17g, and 17r. Thus, there is no need for providing a scan electrode driving circuit 25 for each of the B, G, and R liquid crystal display elements 6b, 6g, and 6r, which allows the multi-layer liquid crystal display element 1 to be provided with driving circuits having a simple configuration. Further, since a reduction can be achieved in the number of scan electrode driver ICs, the multi-layer liquid crystal display element 1 can be provided at a low cost. An output terminal of the scan electrode driving circuit 25 may be commonly used for blue, green, and red as thus described when occasion demands.

An alignment film 20b is applied throughout the second substrate 9b of the B liquid crystal display element 6b over the scan electrodes 19b, the film serving as a functional film for controlling the alignment of the liquid crystal molecules. A polyimide resin or an acryl resin may be used as the alignment film 20b. The alignment film 20b may be used also as an insulating thin film. The alignment film 20b has the function of preventing shorting between the electrodes 17b and 19b, and it also serves as a gas barrier layer improving the reliability of the B liquid crystal display element 6b. Although the alignment film 20b is formed only on the second substrate 9b in this embodiment, such a film may be formed also on the first substrate 7b.

Alignment films 20g and 20r are applied throughout the first substrates 7g and 7r of the G liquid crystal display element 6g and R liquid crystal display element 6r over the scan electrodes 19g and 19r, respectively, the films serving as functional films for controlling the alignment of the liquid crystal molecules. The alignment films 20g and 20r will not be described because they are formed from the same material as the alignment film 20b to provide the same functions. Although the alignment films 20g and 20r are formed only on the first substrates 7g and 7r in this embodiment, such films may be formed also on the second substrates 9g and 9r.

As shown in FIG. 2, the B liquid crystal layer 3b is enclosed between the first substrate 7b and the second substrate 9b by a seal material 21b applied to the peripheries of the substrates 7b and 9b. The thickness (cell gap) of the B liquid crystal layer 3b must be kept uniform. In order to maintain a predetermined cell gap, spherical spacers made of a resin or inorganic oxide are dispersed in the B liquid crystal layer 3b. Thus, the cell gap of the B liquid crystal display element 6b is kept uniform.

The G liquid crystal layer 3g is enclosed between the first substrate 7g and the second substrate 9b by a seal material 21g applied to the peripheries of the substrates 7g and 9g. Spherical spacers 22 are dispersed in the G liquid crystal layer 3g to keep the cell gap of the G liquid crystal layer 3g uniform. The R liquid crystal layer 3r is enclosed between the first substrate 7r and the second substrate 9r by a seal material 21r applied to the peripheries of the substrates 7r and 9r. Spherical spacers 22 are dispersed in the R liquid crystal layer 3r to keep the cell gap of the R liquid crystal layer 3r uniform.

It is also preferable to form wall structures having adhesive properties (not shown) around pixels. Preferably, the B, G, and R liquid crystal layers 3b, 3g, and 3r have a cell gap in a range satisfying, for example, 3 μm≦d≦6 μm. The B, G, and R liquid crystal layers 3b, 3g, and 3r have an undesirably low reflectance when the cell gap is smaller than the range and require an excessively high driving voltage when the cell gap is greater than the range.

A visible light absorbing layer 15 is provided on the outer surface (bottom surface) of the second substrate 9r of the R liquid crystal display element 6r. Since the visible light absorbing layer 15 is provided, rays of light which have not been reflected by the B, G, and R liquid crystal layers 3b, 3g, and 3r can be efficiently absorbed. Thus, the focal conic state can be utilized for displaying black. The multi-layer liquid crystal display element 1 can therefore display an image with a high contrast ratio. As thus described, in the reflection type multi-layer liquid crystal display element 1, the visible light absorbing layer 15 provided on the surface opposite to the display screen allows the planar state and the focal conic state to be utilized for displaying "a bright state" and "a dark state", respectively. The visible light absorbing layer 15 may be provided as occasion demands.

Although not shown, a multi-layer liquid crystal display element 1 thus completed may be provided with an input/output device and a control device for exercising overall control (neither of the devices is shown) to obtain electronic paper.

Figure 3:
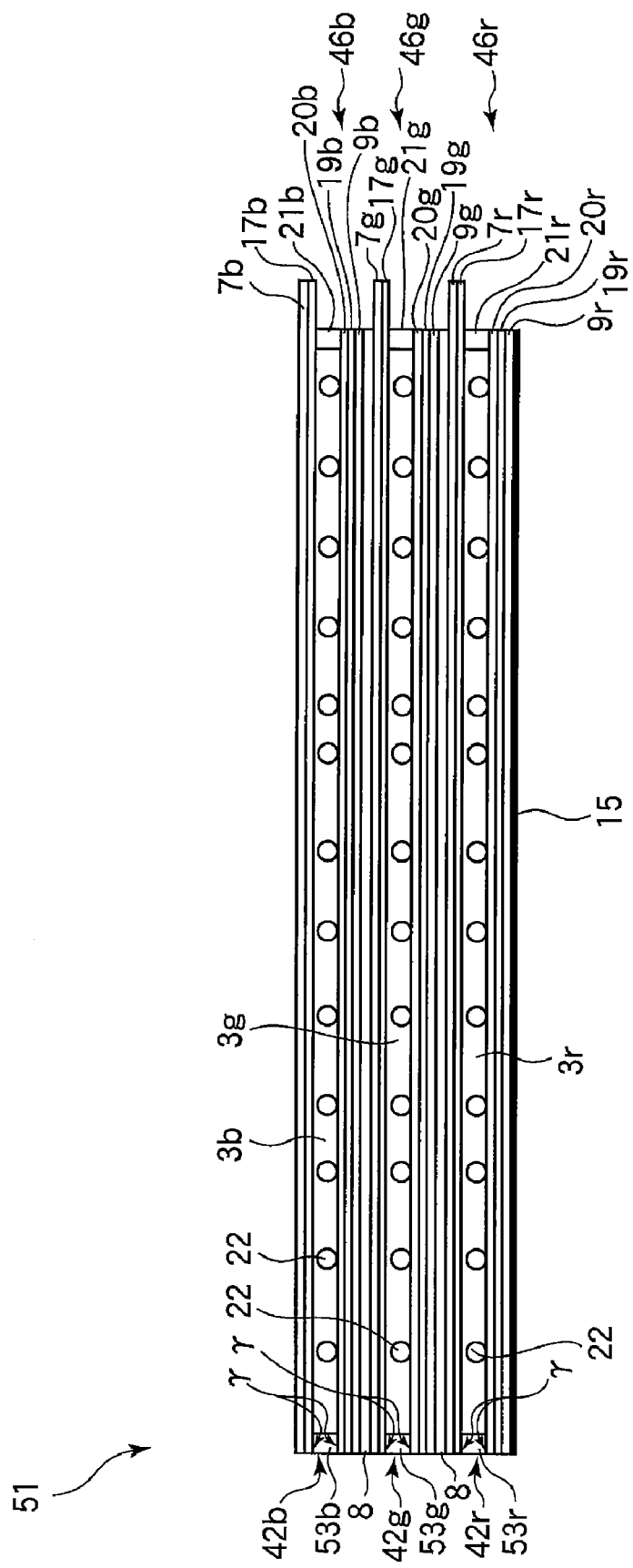
FIG. 3 is an illustration showing a sectional configuration of a display section of a multi-layer liquid crystal display element 51 according to the related art.

Effects of the multi-layer liquid crystal display element 1 of the present embodiment will now be described with reference to FIGS. 2 and 3. FIG. 3 schematically shows a sectional configuration of a multi-layer liquid crystal display element 51 according to the related art. In FIG. 3, components providing the same effects and functions as those in the multi-layer liquid crystal display element 1 of the present embodiment are indicated by the same reference numerals as used in the element 1, and the description will omit such components.

As shown in FIG. 3, the multi-layer liquid crystal display element 51 includes a B liquid crystal display element 46b, a G liquid crystal display element 46g, and an R liquid crystal display element 46r. The B liquid crystal display element 46b, the G liquid crystal display element 46g, and the R liquid crystal display element 46r are stacked in the order listed from the side of the element where a display surface is provided.

The B liquid crystal display element 46b is different from the B liquid crystal display element 6b of the present embodiment in that it has a seal material 21b and a liquid crystal injection port 42b having different shapes. The seal material 21b of the B liquid crystal display element 46b is in the form of a frame extending along the periphery of a second substrate 9b, the frame having a discontinuity in the position where the liquid crystal injection port 42b is formed. An enclosing material 53b is formed in the liquid crystal injection port 42b. An acrylic resin is used as the enclosing material 53b. The enclosing material 53b has substantially the same width as the seal material 21b, and it is formed like a rectangular parallelepiped as a whole. A B liquid crystal layer 3b is enclosed between a first substrate 7b and a second substrate 9b by the seal material 21b and the enclosing material 53b. A G liquid crystal display element 46g and an R liquid crystal display element 46r will not be described because they are similar in configuration to the B liquid crystal display element 46b.

As shown in FIG. 3, the sealing materials 53b, 53g, and 53r have a small width because they are substantially the same as the seal materials 21b, 21g, and 21r in width. Therefore, the sealing materials 53b, 53g, and 53r contact the first substrates 7b, 7g, and 7r and the second substrates 9b, 9g, and 9r in respective contact regions γ which are relatively small. Further, the enclosing materials 53b, 53g, and 53r made of an acrylic resin have low adhesion to the first substrates 7b, 7g, and 7r and the second substrates 9b, 9g, and 9r as apparent from the above description. Therefore, the multi-layer liquid crystal display element 51 suffers from breakage starting at edges of junctions between the enclosing materials 53b, 53g, and 53r and the first substrates 7b, 7g, and 7r and the second substrates 9b, 9g, and 9r, i.e., edges of regions where the enclosing materials 53b, 53g, and 53r contact the first substrates 7b, 7g, and 7r, the second substrates 9b, 9g, and 9r, and the B, G, and R liquid crystal layers 3b, 3g, and 3r. As thus described, in the multi-layer liquid crystal display element 51, delamination of the first substrates 7b, 7g, and 7r and the second substrates 9b, 9g, and 9r is likely to occur at enclosing portions where the enclosing materials 53b, 53g, and 53r are formed, and the strength of the enclosing portions is thereby reduced.

As shown in FIG. 2, the multi-layer liquid crystal display element 1 of the present embodiment has the first through holes 10b, 10g, and 10r having a small diameter provided in the first substrates 7b, 7g, and 7r, respectively. As will be described later, the liquid crystal injection port 2b, 2g, and 2r are used also as suction ports for depressurizing the interior of the liquid crystal cells. The second through holes 12b, 12g, and 12r are formed with such an aperture shape that air, the liquid crystals, and the enclosing materials can easily pass through the holes. On the contrary, the first through holes 10b, 10g, and 10r are formed with such an aperture shape that the enclosing materials having viscosity higher than that of the liquid crystals cannot easily pass through the holes while air and the liquid crystals can easily pass. For example, the second through holes 12b, 12g, and 12r have a circular aperture shape with a diameter of about 4 mm, and the first through holes 10b, 10g, and 10r have an aperture shape with a diameter of about 0.5 mm.

Since the first through holes 10b, 10g, and 10r are provided with a smaller diameter as described above, the enclosing materials 4b, 4g, and 4r filling the liquid injection ports 2b, 2g, and 2r contact the first substrates 7b, 7g, and 7r, respectively, in the contact regions α which are greater than the contact regions γ. The enclosing materials 4b, 4g, and 4r contact the second substrates 9b, 9g, and 9r in the contact regions β, and the materials contact the bonding layers 8 with a contact area equivalent to the aperture area of the second through holes 12b, 12g, and 12r. As a result, the enclosing materials 4b, 4g, and 4r contact other features of the element such as the first substrates 7b, 7g, and 7r in wider regions compared to the sealing materials 53b, 53g, and 53r. Further, the B liquid crystal display element 6b and the R liquid crystal display element 6r provided on two sides of the element are disposed such that the first through holes 10b and 10r open to the exterior of the element. The enclosing materials 4b and 4r are covered by the first substrates 7b and 7r. Therefore, the multi-layer liquid crystal display element 1 of the present embodiment can be significantly improved in the strength of the enclosing portions having the enclosing materials 4b, 4g, and 4r formed therein when compared to the multi-layer liquid crystal display element 51 according to the related art.

As described above, the enclosing portions of the multi-layer liquid crystal display element 1 of the present embodiment can be provided with high strength even though the flexible first substrates 7b, 7g, and 7r and second substrates 9b, 9g, and 9r made of a resin are used. Therefore, even when the internal pressure of the multi-layer liquid crystal display element 1 increases as a result of an increase in the volume of the B, G, and R liquid crystal layers 3b, 3g, and 3r attributable to a change in the ambient temperature, the liquid crystals can be prevented from leaking through the first through holes 10b, 10g, and 10r and the second through holes 12b, 12g, and 12r.

When the through holes for injecting liquid crystals have a small diameter as seen in the present embodiment, since the contact regions between the first and second substrates and the enclosing materials have a great surface area, the enclosing portions of the multi-layer liquid crystal display element have improved strength. The surface area of the contact regions between the first and second substrates and the enclosing materials is increased further, for example, when the element has a configuration in which a first through hole 10b having a small diameter is formed in the first substrate 7b with no through hole formed in the second substrate 9b. Thus, the strength of the enclosing portions of the multi-layer liquid crystal display element can be further improved. However, such a configuration does not allow liquid crystals to be simultaneously injected into a plurality of vacant cells as will be described later, and a problem therefore arises in that the throughput of manufacturing steps cannot be improved.

Figure 6:
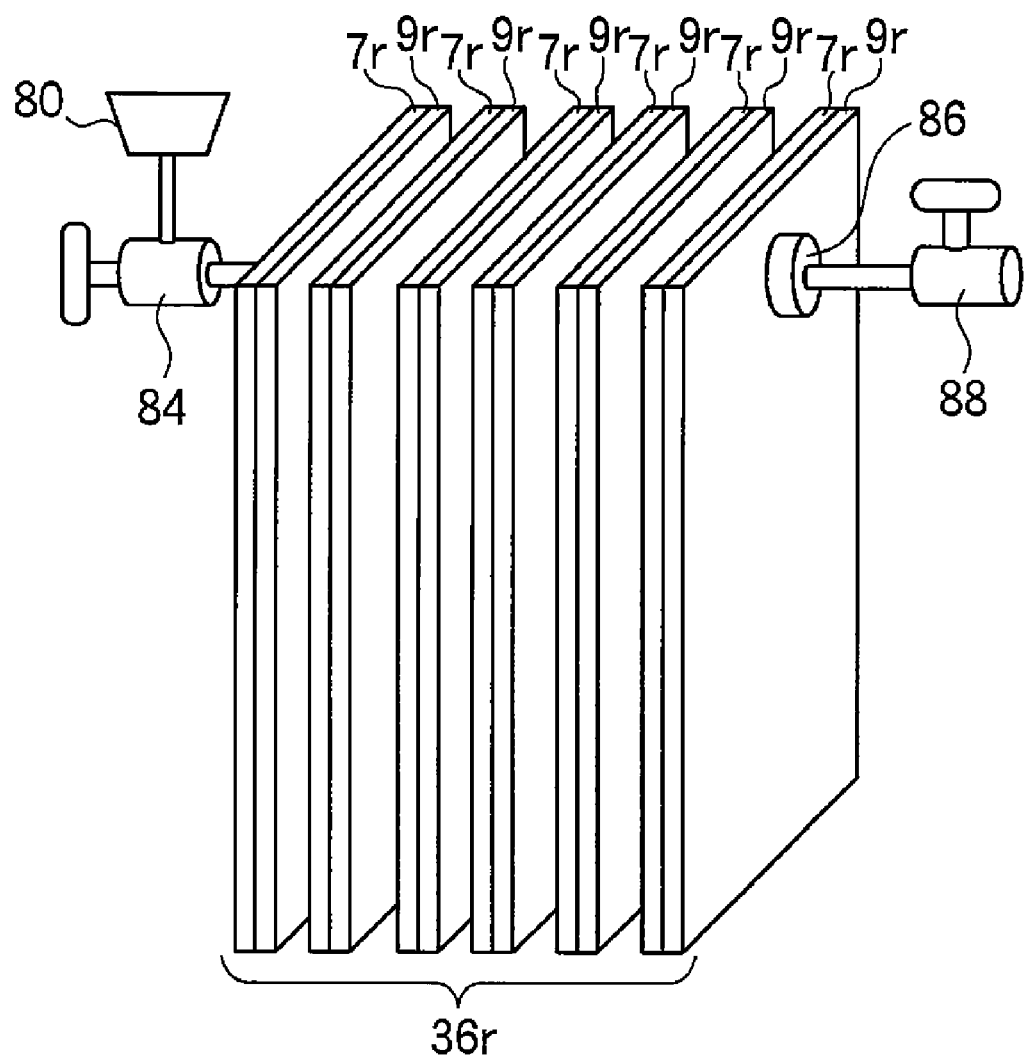
FIG. 6 is an illustration for explaining still the step (III) for manufacturing the multi-layer liquid crystal display element 1 according to the embodiment of the invention.
Figure 7:
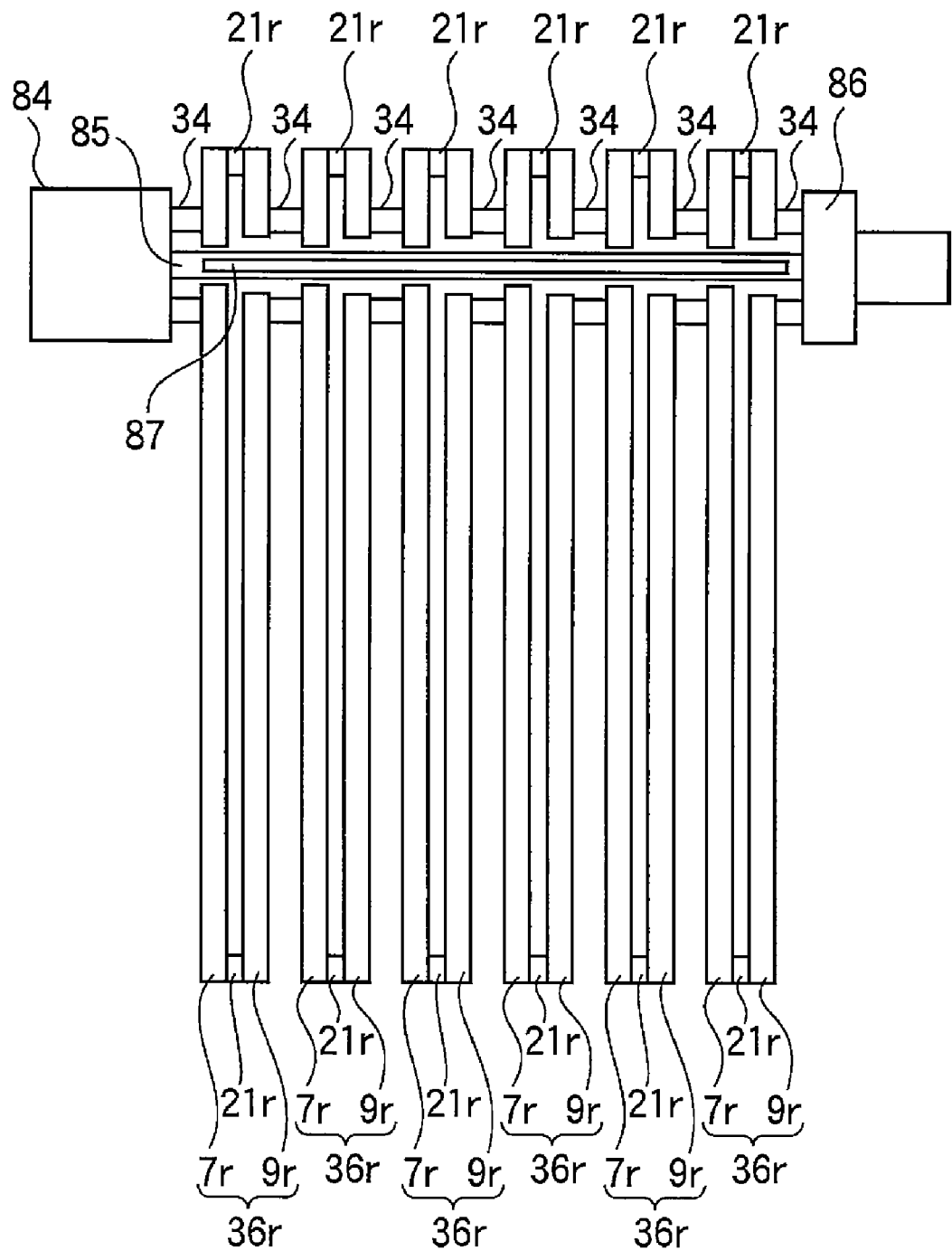
FIG. 7 is an illustration for explaining the step (IV) for manufacturing the multi-layer liquid crystal display element 1 according to the embodiment of the invention.

Methods of manufacturing a liquid crystal display element and a multi-layer liquid crystal display element utilizing such elements according to the present embodiment will now be described with reference to FIG. 2 and FIGS. 4A to 9. FIGS. 4A to 8 are illustrations for explaining a method of manufacturing a liquid crystal display element 6r for red. FIGS. 4A and 4B show a vacant cell 36r for red in which no liquid crystal for red has been injected yet. FIG. 4A is a perspective view of the R vacant cell 36r, and FIG. 4B is a sectional view of the cell taken along the line A-A in FIG. 4A. FIG. 5 schematically shows a liquid crystal injection step (I) for injecting a liquid crystal in R vacant cells 36r. FIG. 6 schematically shows the liquid crystal injection step (II) for injecting the liquid crystal in R vacant cells 36r. FIG. 7 schematically shows the liquid crystal injection step (III) for injecting the liquid crystal in R vacant cells 36r. FIG. 8 schematically shows a liquid crystal enclosing step for enclosing the liquid crystal in a liquid crystal display panel 38r for red.

In the method of manufacturing a liquid crystal display element according to the present embodiment, a pair of substrates are combined by depressurizing the interior of a vacant cell, and a liquid crystal is injected into a plurality of vacant cell simultaneously. As described above, a liquid crystal display element is fabricated in general by combining a pair of substrates to form a vacant cell, injecting a liquid crystal into the vacant cell thereafter using a vacuum pumping system, and applying an adhesive member for enclosure to the injection port. When a cell is formed by combining resin substrates, problems can arise including damages on the substrates attributable to particles and non-uniformity of the cell gap resulting from non-uniformity of the pressure applied to combine the substrates. As a solution to those problems, Patent Documents 1 and 2 disclose a method including the steps of depressurizing the interior of a vacant cell and pressuring a pair of substrates disposed opposite to each other using the atmospheric pressure to combine the pair of substrates. Patent Documents 1 and 2 disclose a method of combining substrates to form a plurality of vacant cells simultaneously, the method including the steps of forming a through hole in each vacant cell and connecting the holes with a packing or the like to allow the plurality of vacant cells to be simultaneously depressurized. The present embodiment utilizes the manufacturing methods disclosed in Patent Documents 1 and 2.

First, as shown in FIGS. 4A and 4B, a plurality of strip-like data electrodes 19r extending substantially in parallel with each other are formed on, for example, a film substrate, and an alignment film 20r is formed throughout the substrate surface over the data electrodes 19r. The film substrate is then punched to form a first through hole 10r having a diameter of, for example, about 0.5 mm. Thus, a first substrate 7r is completed. Next, a plurality of strip-like scan electrodes 17r extending substantially in parallel with each other are formed on, for example, a film substrate. The film substrate is then punched to form a second through hole 12r having a diameter of, for example, about 4 mm such that the through hole will face the first through hole 10r when the first substrate 7r and the second substrate 9r are disposed opposite to each other later. Thus, a second substrate 9r is completed.

Next, spacers 22 are dispersed throughout the first substrate 7r. Then, a frame-like seal material 21r is applied to the periphery of the second substrate 9r. The first substrate 7r and the second substrate 9r are then aligned and combined with each other such that the center axes of the first through hole 10r and the second through hole 12r are substantially aligned with each other and such that the scan electrodes 17r and the data electrodes 19r intersect each other. At this step, the second substrate 9r is only preliminarily placed on the first substrate 7r, and the first substrate 7r and the second substrate 9r are not completely combined and secured with each other. Thus, a vacant cell 36r for red having a liquid crystal injection port 2r is formed.

Next, as shown in FIG. 5, a plurality of R vacant cells 36r (six cells in FIG. 5) are prepared, and the cells are disposed such that the center axes of the liquid crystal injection ports 2r of the plurality of R vacant cells 36r are substantially aligned with each other. In order to prevent the R vacant cells 36r from contacting and damaging each other when they are connected, ring-like packings 34 are sandwiched between the cells at connecting regions which are positions where the liquid crystal injection ports 2r are formed. For example, the packings 34 are formed from silicon rubber, and they have a toroidal shape with a thickness of 1.0 mm, an outer diameter of 7.0 mm, and an inner diameter of 4.0 mm.

Next, as indicated by a thick arrow in FIG. 5, a pipe 85 is inserted through the liquid crystal injection port 2r of the R vacant cells 36r, and an end of the pipe is connected to a two-way cock 88 for vacuum absorption. As shown in FIG. 6, the plurality of R vacant cells 36 (six cells in FIG. 6) are thereby connected. For example, the pipe 85 is formed from stainless steel, and it has a cylindrical shape with an outer diameter of 3.0 mm and an inner diameter of 2.5 mm. The pipe 85 has a slit 87 extending on a side of the same, the slit having, for example, a width of 0.5 mm and a length of 6.5 mm. Instead of the slit 87, a plurality of openings having a diameter of, for example, 0.3 mm may be distributed on the side of the pipe 85 such that the group of openings extends with a length of 6.5 mm (the openings are not shown).

A two-way cock 84 for liquid crystal injection is provided in advance at another end of the pipe 85. The two-way cock 84 is provided with a liquid crystal receiver 80. The two-way cock 88 for vacuum absorption is disposed opposite to the two-way cock 84 with the R vacant cells 36r sandwiched between them. A check valve (not shown) is provided at an end of the two-way cock 88.

FIG. 7 is a sectional view of the plurality of R vacant cells 36r thus connected, taken on a plane which includes the pipe 85 and which is parallel to the extending direction of scan electrodes (not shown). FIG. 7 includes schematic views of the two-way cock 84, the pipe 85, and a screw 86 taken in a direction orthogonal to the plane parallel to the scan electrodes instead of sectional views of those components. As shown in FIG. 7, the liquid crystal injection ports 2r of the plurality of R vacant cells 36r are pierced by the pipe 85 and fastened by the screw 86, whereby the cells are connected with the packings 34 sandwiched between them. When the plurality of R vacant cells 36r are thus connected, the two-way cock 84 for liquid crystal injection is disposed at one end of the pipe 85, and the two-way cock 88 for vacuum absorption (see FIG. 5) is disposed at the other end of the pipe.

A closed space is formed inside the seal material 21r of each R vacant cell 36r by the first substrate 7r and the second substrate 9r facing each other with the spacers 22 interposed between them (see FIG. 4). The spaces in the liquid crystal injection ports 2r of the R vacant cells 36r sandwiched between the two-way cock 84 and the screw 86 are in communication with the spaces inside the seal materials 21r, and the spaces are kept in a closed state by the packings 34. The pipe 85 having the slit 87 extends through the spaces in the liquid crystal injection ports 2r. The two-way cock 84 is connected to one end of the pipe 85, and the two-way cock 88 is connected to the other end of the pipe. Therefore, the two-way cocks 84 and 88 are in communication with the spaces inside the seal materials 21r through the slit 87 of the pipe 85 and the spaces in the liquid crystal injection ports 2r.

Next, the R vacant cells 36r thus connected are placed in a thermostatic oven (not shown), and the two-way cock 88 for vacuum absorption is connected to a connection port of the thermostatic oven. The two-way cock 88 for vacuum absorption is then opened with the two-way cock 84 for liquid crystal injection closed, whereby vacuum absorption is performed through the connection port using a vacuum pump (not shown).

When vacuum absorption is performed through the connection port using the vacuum pump in such a state, the spaces inside the seal materials 21r are depressurized through the two-way cock 88 for vacuum absorption, the pipe 85, the slit 87, and the liquid crystal injection ports 2r. As a result, the atmospheric pressure acts on surfaces of the first substrates 7r and the second substrates 9r to combine and secure the first substrates 7r and the second substrates 9r with each other.

Since the first substrates 7r and the second substrates 9r are uniformly pressed by the atmospheric pressure as a result of the depressurization of the spaces inside the seal materials 21r, the problem of non-uniform cell gaps as encountered in the related art can be prevented.

When the seal materials 21r are formed using a thermo-curing resin, the seal materials 21r are cured by setting the thermostatic oven at a temperature of, for example, 160° C. When the seal materials 21r are formed using a photo-curing resin, the R vacant cells 36r as a whole are irradiated by light from outside to cure the seal materials 21r.

When the first substrate2 7r and the second substrates 9r are combined and secured with each other, the two-way cock 88 for vacuum absorption is closed with the two-way cock 84 for liquid crystal injection kept closed, and the R vacant cells 36r in the connected state are removed from the thermostatic oven.

Next, a liquid crystal prepared to reflect red light selectively is dispensed in a dose of, for example, 1 cc to the liquid crystal receiver 80 of the two-way cock 84 for liquid crystal injection. At this time, the two-way cock 84 for liquid crystal injection is kept closed. The R vacant cells 36r connected with each other are placed in another thermostatic oven (not shown) which is kept at a temperature for liquid crystal injection of, for example, 70° C. Next, the two-way cock 84 for vacuum absorption is connected to a connection port of the thermostatic oven.

Since the spaces inside the seal materials 21r are kept in the depressurized state, when the two-way cock 84 for liquid crystal injection is opened, the liquid crystal dispensed onto the liquid crystal receiver 80 is injected into the spaces inside the seal materials 21r through the two-way cock 84, the pipe 85, the slit 87, and the liquid crystal injection ports 2r. Thus, R liquid crystal layers 3r are formed between the first substrates 7r and the second substrates 9r. As thus described, the liquid crystal can be simultaneously injected into the plurality of R vacant cells 36r. When liquid crystal injection is finished, the two-way cock 84 is closed, and the R vacant cells 36r connected with each other are removed from the thermostatic oven. The pipe 85 is then pulled out from the liquid crystal injection ports 2r to separate the set of the plurality of R vacant cells 36r into individual cells.

Figure 8A:
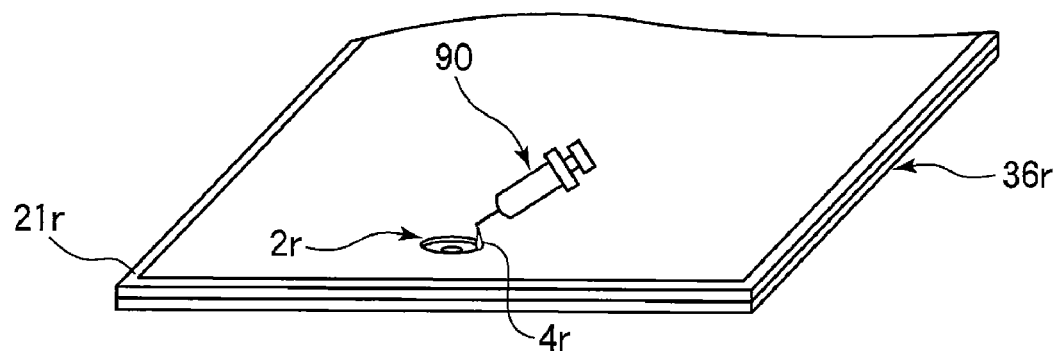
FIGS. 8A and 8B are illustrations for explaining the step (V) for manufacturing the multi-layer liquid crystal display element 1 according to the embodiment of the invention.

Next, an enclosing material 4r is applied to each liquid crystal injection port 2r using a dispenser 90 as shown in FIG. 8A. The liquid crystal which has filled the liquid crystal injection port 2r is made to flow out the injection port by the weight of the enclosing material 4r. Since the enclosing material 4r and the liquid crystal are compatible with each other, the enclosing material 4r flows into the gap between the first substrate 7r and the second substrate 9r in the neighborhood of the liquid crystal injection port 2r while mixing with the R liquid crystal layer 3r.

Figure 8B:
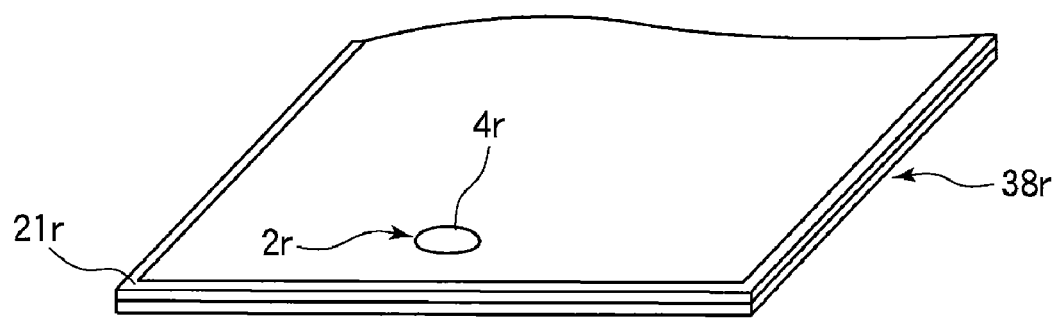

In a liquid crystal display element described in Patent Documents 1 and 2, a through hole formed in each of a pair of substrates disposed opposite to each other has substantially the same aperture area as that of the second through hole 10b. Therefore, when an enclosing material is applied to a liquid crystal injection port of the liquid crystal display element according to the related art with the liquid crystal display element disposed horizontally as shown in FIG. 8A, the enclosing material can pass through the liquid crystal injection port. Therefore, the enclosing material must be applied with the liquid crystal display element disposed vertically at such a manufacturing step according to the related art, which can result in a reduction in the throughput of the manufacturing step. In the present embodiment, the first through hole 10b is formed in such a size that air can easily pass the same but the enclosing material 4r cannot easily pass. Therefore, even when an R cell 36r having an R liquid crystal layer 3r injected therein is horizontally disposed as shown in FIG. 8A, the enclosing material 4r does not pass through the first through hole 10r because of the surface tension of the first substrate 7r exposed in the first through hole 10r and the viscosity of the enclosing material 4r. As a result, the enclosing material 4r can be accumulated in the liquid crystal injection port 2r as shown in FIG. 8B to cause it to penetrate into the gap between the first substrate 7r and the second substrate 9r. As thus described, the step of applying the enclosing material 4r is facilitated in the present embodiment.

When the enclosing material 4r is formed using a photo-curing resin, the enclosing material 4r is cured by irradiating it with light. Thus, an R liquid crystal display panel 38r is completed as shown in FIG. 8B. Next, a B liquid crystal display panel 38b and a G liquid crystal display panel 38g (which are not shown) are fabricated using the same method as for the R liquid crystal display panel 38r.

Next, a flexible printed circuit board (FPC) is attached to each of groups of scan electrodes 17r and data electrodes 19r exposed on the exterior of the panel. Similarly, an FPC is attached to each of groups of scan electrodes 17b and 17g and data electrodes 19b and 19g of the B and G liquid crystal display panels. For example, a transparent adhesive having appropriate optical characteristic is then dispensed or applied onto the first substrate 7r of the R liquid crystal display panel 38r. Next, the first substrate 7r is disposed in a face-to-face relationship with the second substrate 9g of the G liquid crystal display panel, and the G liquid crystal display panel 38g is aligned and combined with the R liquid crystal display panel 38r from above such that the center axes of the liquid crystal injection ports 2r and 2g are substantially aligned with each other. The transparent adhesive is cured using visible light or heat to form a bonding layer 8. Thus, the R liquid crystal display panel 38r and the G liquid crystal display panel 38g are stacked and bonded with each other. The B liquid crystal display panel 38b is stacked on the G liquid crystal display panel 38g and bonded to the panel using the same method. At this time, the B liquid crystal display panel 38b and the G liquid crystal display panel 38g are bonded such that the center axes of the first through hole 10b and the second through hole 12b are substantially aligned with the center axes of the first through hole 10b and the second through hole 12b. Further, a visible light absorbing layer 15 may be applied to the first substrate 7r of the R liquid crystal display panel 38r using the transparent adhesive as occasion demands.

Next, the FPCs connected to the scan electrodes of the B, G, and R liquid crystal panels 38b, 38g, and 38r, respectively, are mounted on a scan electrode driving circuit 27, and the FPCs connected to the respective data electrodes are mounted on a data electrode driving circuit 25. Thus, a multi-layer liquid crystal display element 1 is completed.

Figure 9:
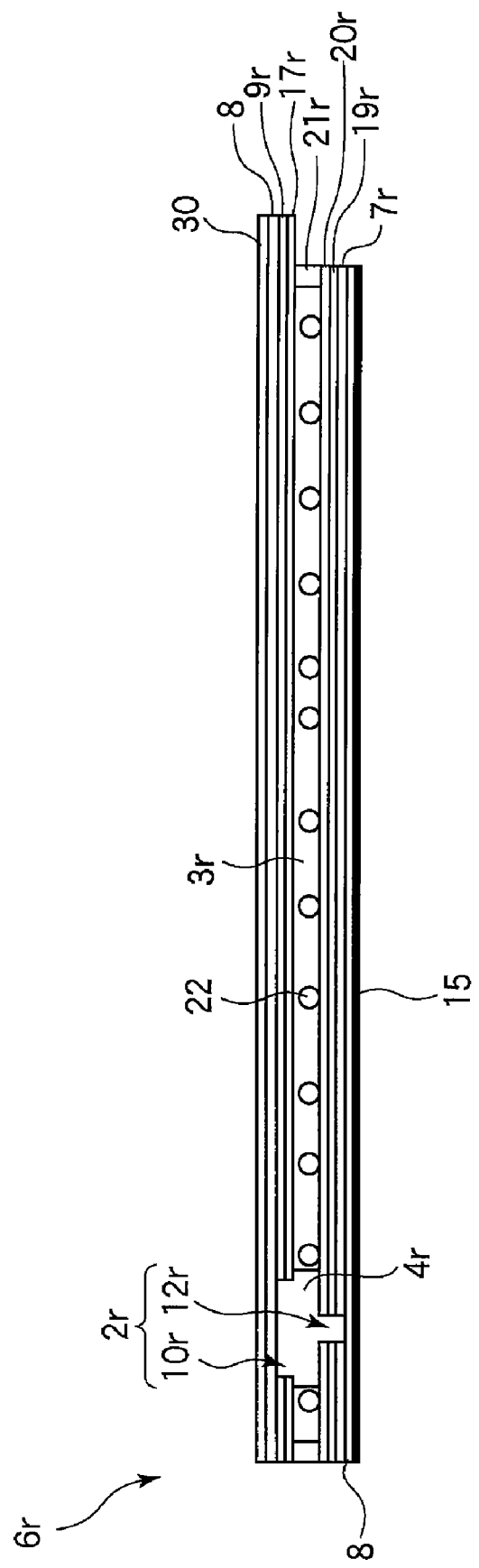
FIG. 9 is an illustration showing a sectional configuration of a display section of a liquid crystal display element according to the embodiment of the invention.

As shown in FIG. 9, for example, an anti-reflection film 30 may be applied to the second substrate 9r of the R liquid crystal display panel 38r to serve as a display surface the element using a bonding layer, and a visible light absorbing layer 15 may be applied to the first substrate 7r opposite to the display surface using a bonding layer 8. Then, FPCs, which are not shown, may be attached to the scan electrodes 17r and the data electrodes 19r, respectively. The FPC connected to the scan electrodes may be mounted on a scan electrode driving circuit 27, and the FPC connected to the data electrodes may be mounted on a data electrode driving circuit 25. Thus, a monochromatic liquid crystal display element capable of display in red is completed.

As described above, according to the present embodiment, a liquid crystal can be simultaneously injected into a plurality of vacant cells. Further, the enclosing materials 4b, 4g, and 4r can be easily applied to the liquid crystal injection ports 2b, 2g, and 2r. Thus, the throughput of manufacturing steps of the multi-layer liquid crystal display element 1 can be improved.

Through holes for liquid crystal injection provided in the liquid crystal display element disclosed in Patent Document 1 or 2 has an aperture shape which is substantially equal in size to the aperture shape of the second through holes 12b, 12g, and 12r of the present embodiment. Therefore, in the liquid crystal display element disclosed in Patent Document 1 or 2, a contact region between an enclosing material and a pair of substrates has an area which is substantially the same as the area of the contact region β shown in FIG. 2. The contact regions α between the first substrates and the enclosing materials of the multi-layer liquid crystal display element 1 of the present embodiment have a relatively great area, and the element 1 is therefore improved accordingly in the strength of enclosing portions compared to the liquid crystal display element disclosed in Patent Document 1 or 2.

Figure 10:
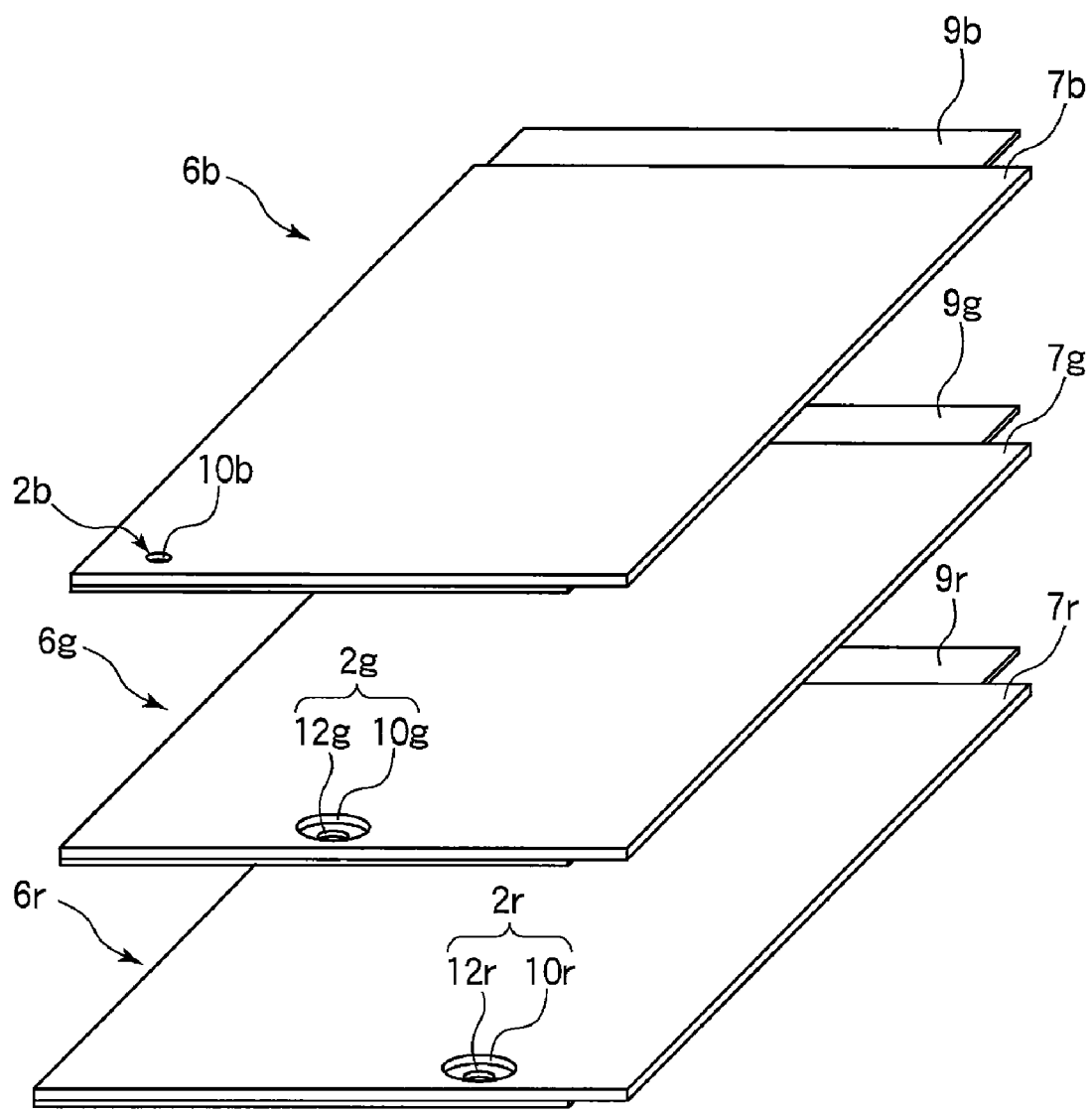
FIG. 10 is an exploded perspective view of a display section of a multi-layer liquid crystal display element 1 according to a modification of the embodiment of the invention.
Figure 11:
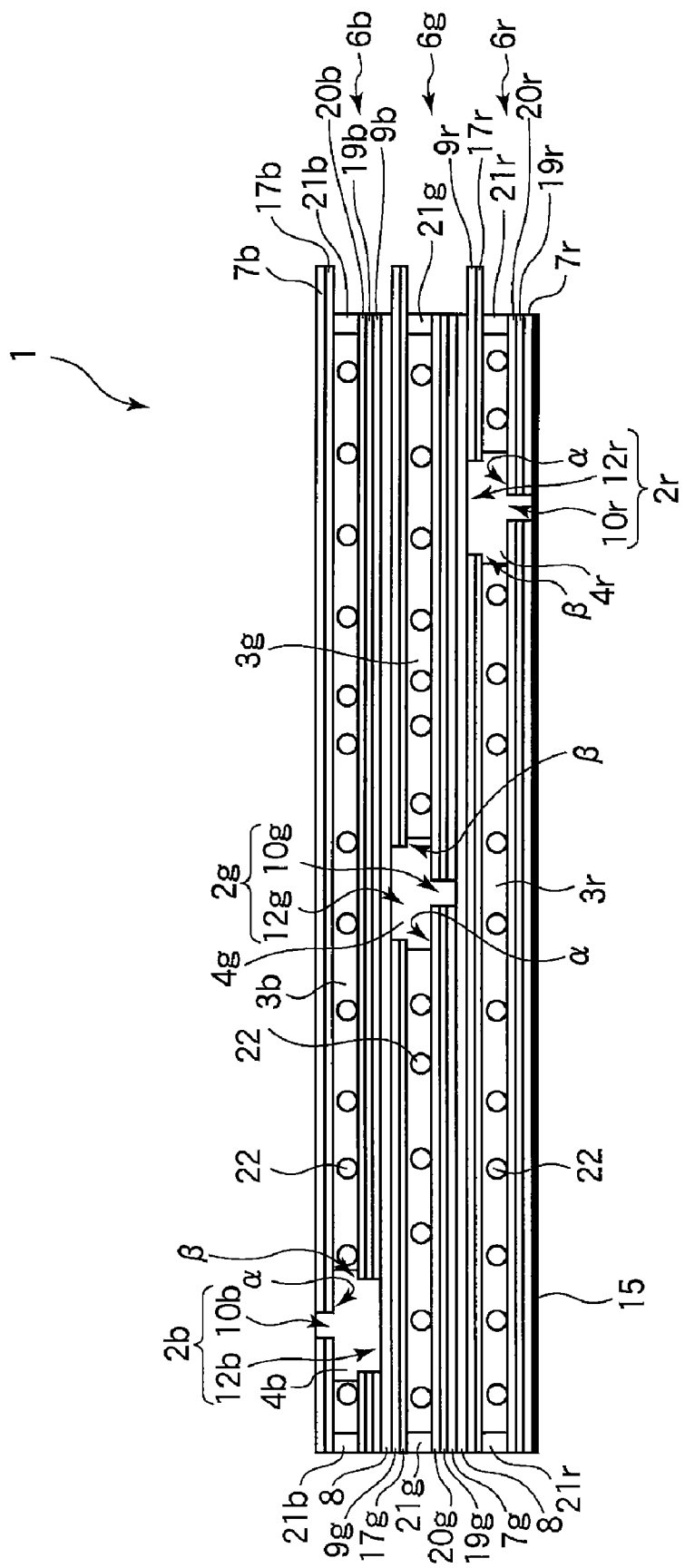
FIG. 11 is an illustration showing a sectional configuration of the display section of the multi-layer liquid crystal display element 1 according to the modification of the embodiment of the invention.

A multi-layer liquid crystal display element according to a modification of the present embodiment will now be described with reference to FIGS. 10 and 11. In a multi-layer liquid crystal display element 1 according to the modification, first through holes 10b, 10g, and 10r and second through holes 12b, 12g, and 12r formed in B, G, and R liquid crystal display elements 6b, 6g, and 6r, respectively, are disposed in such positions that the pairs of through holes do not overlap each other when viewed in the normal direction of substrate surfaces. FIG. 10 is an exploded perspective view of display sections of the B, G, and R liquid crystal display elements 6b, 6g, and 6r. FIG. 11 is a sectional view of the display sections of the multi-layer liquid crystal display element 1 taken on a plane including center axes of the first through holes 10b, 10g, and 10r and the second through holes 12b, 12g, and 12r and extending in parallel with scan electrodes 17b, 17g, and 17r. Components of the element having the same effects and functions as those of the multi-layer liquid crystal display element 1 shown in FIG. 2 are indicated by the same reference numerals as used in FIG. 2 and will not be described below.

As shown in FIGS. 10 and 11, the first through hole 10b and the second through hole 12b of the B liquid crystal display element 6b are formed at corner sections of a first substrate 7b and a second substrate 9b on sides of the substrates where neither scan electrodes 17b nor data electrodes 19b are exposed. The first through hole 10g and the second through hole 12g of the G liquid crystal display element 6g are formed in the middle of edges of the substrates on a side thereof where the data electrodes 19g are not exposed. The first through hole 10r and the second through hole 12r of the R liquid crystal display element 6r are formed at corner sections of the first substrate 7b and the second substrate 9b on sides of the substrates where the scan electrodes 17r are exposed and the data electrodes 19b are not exposed. The center axes of the first through holes 10b, 10g, and 10r and the second through holes 12b, 12g, and 12r are substantially aligned in a straight line in an in-plane direction of the substrates.

As shown in FIG. 11, the through holes are disposed in such positions that no overlap exists between the pairs of through holes, i.e., the pair of the first through hole 10b and the second through hole 12b, the pair of the first through hole 10g and the second through hole 12g, and the pair of the first through hole 10r and the second through hole 12r. Enclosing materials 4b, 4g, and 4r have contact regions α and β which are substantially the same as those of the enclosing materials 4b, 4g, and 4r of the multi-layer liquid crystal display element 1 shown in FIG. 2. Therefore, the multi-layer liquid crystal display element 1 of the present modification provides the same advantages as those of the multi-layer liquid crystal display element 1 shown in FIG. 2.

The invention is not limited to the above-described embodiment and may be modified in various ways. While the first through holes 10b, 10g, and 10r and the second through holes 12b, 12g, and 12r of the above-described embodiment are sealed with the enclosing materials 4b, 4g, and 4r, respectively, the invention is not limited to such a configuration. For example, the first through holes 10b, 10g, and 10r and the second through holes 12b, 12g, and 12r may be sealed using part of the respective bonding layers 8 in addition to the enclosing materials 4b, 4g, and 4r.

The invention may be applied to liquid crystal display elements having a configuration in which a liquid crystal is sandwiched between a pair of substrates disposed opposite to each other.

What is claimed is:

1. A multi-layer liquid crystal display element comprising a plurality of liquid crystal display elements stacked one over another, wherein each of the liquid crystal display elements includes:
    a first substrate having a first through hole formed to extend from one surface to another;
    a second substrate disposed opposite to the first substrate and having a second through hole formed opposite to the first through hole to extend from one surface to another, the second through hold having an area greater than that of the first through hole;
    a first electrode formed on either one of the first substrate or the second substrate;
    a second electrode formed on other of the first substrate or the second substrate;
    a seal material provided in the form of a frame extending along the peripheries of the first and second substrates to secure the first and second substrates with each other;
    a liquid crystal sandwiched between the first and second substrates; and
    an enclosing material sealing the first and second through holes such that the liquid crystal does not leak through the first and second through holes,
    wherein the liquid crystal display elements disposed on two sides of the stack are disposed such that the first through holes thereof open to the exterior of the stack, and
    wherein either one of the liquid crystal display elements disposed on two sides of the stack has the first electrode formed on the first substrate and the second electrode formed on the second substrate, and other of the liquid crystal display elements disposed on two sides of the stack has the second electrode formed on the first substrate and the first electrode formed on the second substrate.

2. The multi-layer liquid crystal display element according to claim 1, wherein the first and second through holes formed in each of the plurality of liquid crystal display elements stacked one over another are disposed in such positions that they overlap each other when viewed in the normal direction of the substrate surfaces of the first and second substrates.

3. The multi-layer liquid crystal display element according to claim 1, wherein the first and second through holes formed in each of the plurality of liquid crystal display elements stacked one over another are disposed in such positions that they do not overlap each other when viewed in the normal direction of the substrate surfaces of the first and second substrates.

4. The multi-layer liquid crystal display element according to claim 1, wherein:
    the liquid crystal is a cholesteric liquid crystal selectively reflecting light having a wavelength in a visible band; and
    the plurality of liquid crystal display elements selectively reflect light having wavelengths different from each other.

5. The multi-layer liquid crystal display element according to claim 1, wherein an enclosing region on the first substrate provided by the enclosing material has an area greater than the area of an enclosing region on the second substrate.

6. The multi-layer liquid crystal display element according to claim 1, wherein the enclosing material flows into the gap between the first and second substrates to fill the first and second through holes.

7. The multi-layer liquid crystal display element according to claim 1, wherein the center axis of the first through hole is substantially aligned with the center axis of the second through hole.

8. The multi-layer liquid crystal display element according to claim 1, wherein the first and second through holes have a curved aperture shape when viewed in the normal direction of substrate surfaces of the first and second substrates.

9. The multi-layer liquid crystal display element according to claim 1, wherein the first and second through holes are disposed in the neighborhood of peripheries of the first and second substrates.

10. The multi-layer liquid crystal display element according to claim 1, wherein the liquid crystal is a cholesteric liquid crystal selectively reflecting light having a wavelength in a visible band.

* * * * *